United States Patent
Slinger et al.

(10) Patent No.: US 11,886,297 B2
(45) Date of Patent: Jan. 30, 2024

(54) RESTART TOLERANCE IN SYSTEM MONITORING

(71) Applicant: BMC Software, Inc., Houston, TX (US)

(72) Inventors: Nigel Slinger, Los Gatos, CA (US); Wenjie Zhu, Dublin (IE); Catherine Drummond, Morgan Hill, CA (US); Roxanne Kallman, Ham Lake, MN (US); Sudipta Sengupta, Richmond, TX (US); Jeremy Riegel, Houston, TX (US); John Flournoy, Lago Vista, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 18/054,024

(22) Filed: Nov. 9, 2022

(65) Prior Publication Data

US 2023/0115166 A1    Apr. 13, 2023

Related U.S. Application Data

(63) Continuation of application No. 17/248,396, filed on Jan. 22, 2021, now Pat. No. 11,526,400.

(51) Int. Cl.
*G06F 11/07* (2006.01)
*G06F 11/14* (2006.01)
*H04L 41/0893* (2022.01)

(52) U.S. Cl.
CPC ...... *G06F 11/1438* (2013.01); *G06F 11/0715* (2013.01); *H04L 41/0893* (2013.01)

(58) Field of Classification Search
CPC ............. G06F 11/1438; G06F 11/0715; H04L 41/0893
See application file for complete search history.

(56) References Cited

U.S. PATENT DOCUMENTS

| 10,200,262 | B1 | 2/2019 | Leverich et al. |
| 11,296,971 | B1 | 4/2022 | Jain et al. |
| 2018/0219889 | A1* | 8/2018 | Oliner ...................... G06N 3/08 |
| 2018/0365309 | A1 | 12/2018 | Oliner et al. |
| 2022/0107858 | A1* | 4/2022 | Jain ...................... G06F 11/0751 |

OTHER PUBLICATIONS

Extended European Search Report for European Application No. 21177730.5, dated Nov. 12, 2021, 8 pages.

\* cited by examiner

*Primary Examiner* — Matthew M Kim
*Assistant Examiner* — Kyle Emanuele
(74) *Attorney, Agent, or Firm* — Brake Hughes Bellermann LLP

(57) ABSTRACT

When a restart event is detected within a technology landscape, restart-impacted performance metrics and non-restart-impacted performance metrics may be identified. The non-restart-impacted performance metrics may continue to be included within a performance characterization of the technology landscape. The restart-impacted performance metrics may be monitored, while being excluded from the performance characterization. The restart-impacted performance metric of the restart-impacted performance metrics may be transitioned to a non-restart-impacted performance metric, based on a monitored value of the restart-impacted performance metric following the restart event.

20 Claims, 6 Drawing Sheets

RESTART TOLERANCE IN SYSTEM MONITORING

CROSS-REFERENCE TO RELATED APPLICATION

This application is a continuation of, and claims priority to, U.S. patent application Ser. No. 17/248,396, filed on Jan. 22, 2021, entitled "RESTART TOLERANCE IN SYSTEM MONITORING," the disclosure of which is incorporated by reference herein in its entirety.

TECHNICAL FIELD

This description relates to system monitoring.

BACKGROUND

Many companies and other entities have extensive technology landscapes, which include numerous Information Technology (IT) assets, including hardware and software. It is often required for such assets to perform at high levels of speed and reliability, while still operating in an efficient manner. For example, various types of computer systems are used by many entities to execute mission critical applications and high volumes of data processing, across many different workstations and peripherals.

Various types of system monitoring methods are used to detect, predict, prevent, mitigate, or cure system faults that might otherwise disrupt or prevent monitored assets from achieving system goals. For example, it is possible to monitor various types of performance metrics characterizing aspects of system performance. When monitored values of the detected performance metrics are scored as being outside of a predetermined range, the monitored values may be considered potentially indicative of a current or future system malfunction, and appropriate action may be taken.

During normal system operations, however, it is often necessary or desired to restart a system or component. During such restart operations, values of performance metrics may be outside of corresponding predetermined ranges as a result of the restart operations themselves, and not as a result of any actual malfunction. Consequently, system monitoring techniques during such system restarts may be ineffective at best, and, in some cases, resulting false performance data could result in incorrect decisions being made by system administrators.

SUMMARY

According to one general aspect, a computer program product is tangibly embodied on a non-transitory computer-readable storage medium and comprises instructions. When executed by at least one computing device, the instructions are configured to cause the at least one computing device to detect a restart event within a technology landscape, the technology landscape being characterized using a performance characterization that is based on performance metrics for the technology landscape, and determine, in response to the restart event, restart-impacted performance metrics and non-restart-impacted performance metrics. The instructions, when executed, are further configured to include the non-restart-impacted performance metrics within the performance characterization, monitor the restart-impacted performance metrics while excluding the restart-impacted performance metrics from the performance characterization, and transition a restart-impacted performance metric of the restart-impacted performance metrics to a non-restart-impacted performance metric, based on a monitored value of the restart-impacted performance metric following the restart event.

According to another general aspect, a computer-implemented method includes detecting a restart event within a technology landscape, the technology landscape being characterized using a performance characterization that is based on performance metrics for the technology landscape, and determining, in response to the restart event, restart-impacted performance metrics and non-restart-impacted performance metrics. The method further includes including the non-restart-impacted performance metrics within the performance characterization, monitoring the restart-impacted performance metrics while excluding the restart-impacted performance metrics from the performance characterization, and transitioning a restart-impacted performance metric of the restart-impacted performance metrics to a non-restart-impacted performance metric, based on a monitored value of the restart-impacted performance metric following the restart event.

According to another general aspect, a system includes at least one memory including instructions, and at least one processor that is operably coupled to the at least one memory and that is arranged and configured to execute instructions. When executed, the instructions cause the at least one processor to detect a restart event within a technology landscape, the technology landscape being characterized using a performance characterization that is based on performance metrics for the technology landscape, and determine, in response to the restart event, restart-impacted performance metrics and non-restart-impacted performance metrics. The instructions, when executed, further cause the at least one processor to include the non-restart-impacted performance metrics within the performance characterization, monitor the restart-impacted performance metrics while excluding the restart-impacted performance metrics from the performance characterization, and transition a restart-impacted performance metric of the restart-impacted performance metrics to a non-restart-impacted performance metric, based on a monitored value of the restart-impacted performance metric following the restart event.

The details of one or more implementations are set forth in the accompanying drawings and the description below. Other features will be apparent from the description and drawings, and from the claims.

DETAILED DESCRIPTION

Figure 1:
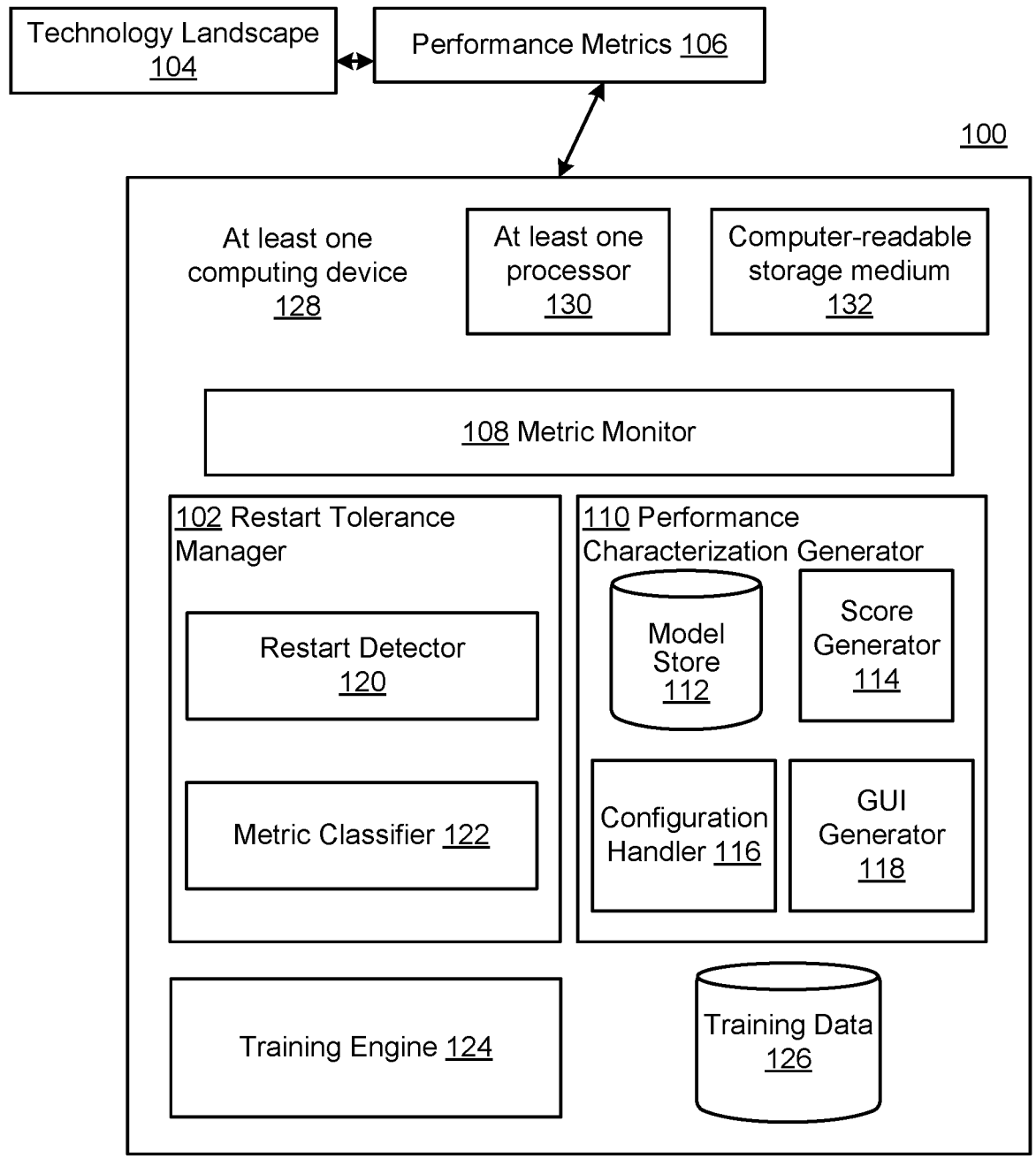
FIG. 1 is a block diagram of a monitoring system with restart tolerance for technology landscapes.

Described systems and techniques provide actionable insights to enable reliable operations across a technology landscape. Such insights include, e.g., detection and characterizations of the nature, location, and timing of an existing or potential anomaly, as well as a severity or trend of such an anomaly. Accordingly, with insights, anomalies may be avoided or resolved in a minimal time period, with minimal effect, and with minimal knowledge, training, and effort required of a system administrator. With such insights, potential anomalies may be predicted and false positives reduced.

In providing the above features and advantages, described systems and techniques enable restart tolerance, in order, for example, to avoid false positives that might otherwise occur during a time period following a restart operation. Described restart tolerance techniques enable avoidance of such false positives, while also enabling continued use of performance metrics that are not affected by the restart operation.

Additionally, in example implementations, described restart tolerance techniques enable determination and identification of performance metrics that are impacted by the restart operation (sometimes referred to herein as restart-impacted performance metrics), as well as performance metrics that are not impacted by the restart operation (sometimes referred to herein as non-restart-impacted performance metrics). Consequently, described monitoring systems continue to benefit from tracking performance metrics that are non-restart-impacted, while excluding the performance metrics that are restart-impacted.

Further, described techniques enable detection of a transition of a performance metric from being restart-impacted to being non-restart-impacted, i.e., not impacted. For example, in a simplified example, it may occur that out of 100 performance metrics, 20 performance metrics are restart-impacted by a restart event, while 80 performance metrics are non-restart-impacted. During a time period following the restart event (sometimes referred to herein as a transition period), the 80 non-restart-impacted performance metrics may continue to be used within any and all analytic or predictive calculations being performed to characterize the technology landscape.

Meanwhile, the 20 restart-impacted performance metrics may continue to be monitored, but may be excluded from the analytic or predictive calculations. Then, during the transition period, individual ones of the 20 restart-impacted performance metrics may transition to being non-restart-impacted (i.e., no longer impacted) by the preceding restart event, until all 20 of the originally restart-impacted performance metrics are no longer impacted. During this transition period following a restart event (which may be set to have a maximum value), described systems and techniques detect the transitions of the individual ones of the 20 restart-impacted performance metrics to being non-restart-impacted, and resume inclusion of the individual, transitioned performance metrics within the analytic and predictive calculations.

Described techniques use artificial intelligence or machine learning to process existing training data and construct one or more performance models. Then, the trained performance models may be used to score values of performance metrics, to obtain a performance characterization of individual, or groups or combinations of, performance metrics. In this way, standardized scores may be assigned within the performance characterization. A real-time system performance may be tracked, and predictions may be made as to whether and when corrective actions may be necessary.

As referenced above, system performance in a technology landscape, such as within a computer or mainframe system, may be tracked and measured using performance metrics. For example, some performance metrics may include performance metrics commonly referred to as key performance indicators, or KPIs. For example, KPIs may include a percentage of central processing unit (CPU) resources in use at a given time, an amount of memory in use, and data transfer rates between system components. A given system may have hundreds or even thousands of KPIs that measure a wide range of performance aspects.

While some system workloads remain the same day to day, most workloads change seasonally, on the weekend, day to day, from shift to shift, and in response to varying other conditions or contexts that may occur. As referenced above, one or more machine learning models may be trained to account for these and other factors, and to assign a score to current value(s) of a specific KPI or group of KPIs. Individually or in the aggregate, these scores may be used to provide a performance characterization of a system, a technology landscape, or portion(s) thereof.

However, as also referenced above, both the training and the scoring of such machine learning models (which may be referred to herein as performance models) may be affected by various restart events that occur within the technology landscape. Techniques described herein minimize or eliminate the effects of such restart events, while continuing to provide maximum available visibility into a status of the overall technology landscape.

FIG. 1 is a block diagram of a monitoring system 100 with restart tolerance for technology landscapes. In FIG. 1, a restart tolerance manager 102 facilitates and provides performance characterization of a technology landscape 104, using performance metrics 106.

In FIG. 1, the technology landscape 104 may represent any suitable source of performance metrics 106 that may be processed for predictions using the system 100. For example, in some embodiments the technology landscape 104 may represent a mainframe computing environment, but the technology landscape 104 is not limited to such environments. For example, the technology landscape 104 may include many types of network environments, such as network administration for a private network of an enterprise. Technology landscape 104 may also represent scenarios in which sensors are used to monitor environmental conditions and report on corresponding status information (e.g., with respect to patients in a healthcare setting, working conditions of manufacturing equipment or other types of machinery in many other industrial settings (including the oil, gas, or energy industry), or working conditions of banking equipment, such as automated transaction machines (ATMs)). In some cases, the technology landscape 104 may include, or reference, an individual computing component, such as a laptop or desktop computer.

Therefore, the term restart event as used herein should be understood to refer to any restart operation that may occur with respect to any system, subsystem, or component of any technology landscape. In some cases, a restart event may occur involuntarily or unexpectedly, such as when a component malfunctions. In other cases, a restart event may occur voluntarily, such as when an administrator desires to conserve power or other resources, or to configure or re-configure an aspect of the technology landscape. The term restart event should also be understood to reference an addition of a new component, subsystem, or system, which was previously not included within the technology landscape 104, but which is added, e.g., to expand available resources of the technology landscape 104, and which must undergo related start-up operations prior to being fully integrated within the technology landscape 104.

The performance metrics 106 may represent any corresponding type(s) of data that is captured and reported, particularly in an ongoing, dynamic fashion, and for a potentially large number of performance metrics. For example, in a healthcare setting, the performance metrics 106 may characterize either a condition of patients being monitored, or a condition of sensors being used to perform such monitoring. Similarly, the performance metrics 106 may characterize machines being monitored, or sensors performing such monitoring, in manufacturing, industrial, energy, or banking settings.

In many of the examples below, which may occur in mainframe or networking environments, the performance metrics 106 may be referred to, or include, key performance indicators (KPIs). The term KPI should be understood broadly to represent or include any measurable value that can be used to indicate a present or future condition, or enable an inference of a present or future condition, with respect to a measured context (including, e.g., the example contexts referenced above). KPIs are often selected and defined with respect to an intended goal or objective, such as maintaining an operational status of a network, or providing a desired level of service to a user.

In some example implementations, the performance metrics 106 may represent or include a large repository of stored data. The system 100 may be instrumental in analyzing such data in a highly fast, efficient, customized, and reliable manner, and with a high restart tolerance, as described herein.

In many implementations, however, the performance metrics 106 represent a real-time or near real-time data stream that is frequently or constantly being received with respect to the technology landscape 104. For example, the performance metrics 106 may be considered to be received within defined time windows, such as every second, every minute, or every hour.

In FIG. 1, a metric monitor 108 receives the performance metrics 106 over time, e.g., in real time. The performance metrics 106 may be monitored in a manner that is particular to the type of underlying resource being monitored. For example, received values (and value ranges) and associated units of measurement may vary widely, depending on whether, for example, an underlying resource includes processing resources, memory resources, or network resources (e.g., related to network bandwidth, or latency).

Additionally, as referenced above, all such values of performance metrics 106 may vary over time, based on a large number of factors. For example, performance metric values may vary based on time of day, time of week, or time of year. Performance metric values may vary based on many other contextual factors, such as underlying operations of a business or other organization deploying the technology landscape 104.

In order to capture and account for such factors, while still providing accurate performance characterizations, a performance characterization generator 110 may use one or more trained machine learning models, represented in FIG. 1 as being stored using a model store 112. A score generator 114 may then score the various performance metric values received through the metric monitor 108, to obtain standardized performance characterizations that are easily interpretable by administrators and other users, and that may be used in conjunction with one another to provide a multivariate analysis of desired aspects of the technology landscape 104.

For example, in some scoring systems threshold values are set such that scores above/below zero within a first threshold(s) (e.g., from −1.5 to 1.5, or from −3.0 to 3.0) are considered "green," or acceptable, scores outside of the first threshold, but within a second threshold(s) (e.g., from −3.0 to −1.5 and from 1.5 to 3.0, or from −6 to −3 and from 3 to 6), are considered "yellow," or cautionary, and scores outside of the second threshold(s) (e.g., less than −3 or more than 3, or less than −6 or more than 6) are considered "red" or anomalous.

In additional or alternative scoring schemes, performance metric values may be normalized for scoring between 0 and 100 (or some other minimum/maximum value), where either 0 or 100 may be selected as an optimal value. Then, ranges within the 0 to 100 range may be designated as stable, warning, or critical.

These approaches are merely examples, and, as described herein, other scoring values, ranges, and thresholds may be established with respect to performance metric values. Moreover, within each such scoring system, a configuration handler 116 may be provided, which enables an administrator or other user to designate or otherwise configure sensitivities or other aspects of the scores provided by the score generator 114. For example, a provider of the performance characterization generator 110 may specify default values, thresholds, or ranges, but the configuration handler 116 may provide a user with an ability to modify these defaults in a desired manner.

A graphical user interface (GUI) generator 118 may be configured to generate any suitable GUI that displays a performance characterization in a desired manner. Specific examples of such GUIs are included below, e.g., with respect to FIGS. 5 and 6. In general, however, a generated GUI may display any specified performance metrics, or groups or combinations thereof. A generated GUI may display time periods during which performance metrics were captured or scored. A generated GUI may display specific systems or subsystems of the technology landscape 104 that are scored.

A generated GUI may display many other performance characterizations that are not discussed here in detail. For example, a generated GUI may characterize scoring trends over time of one or more performance metric scores, e.g., as a way of predicting a future malfunction.

In specific examples described herein and related to operations of the restart tolerance manager 102, the GUI generator 118 may be configured to generate one or more GUIs that indicate specific, restart-impacted performance metrics. For example, the GUI may replace a normal score or other performance characterization with an icon or other indicator labelling the relevant performance indicators as restart-impacted. At the same time, the GUI may continue to display normal performance characterizations for non-restart-impacted performance metrics. Then, during a transition period following a restart event, the GUI may transition the displays (e.g., icons) indicating restart-impacted performance metrics back to normal performance characterizations, as each restart-impacted performance metric is determined to transition to being no longer restart-impacted, or until a maximum time for the transition period is reached.

To enable these and other features, the restart tolerance manager 102 may include a restart detector 120 and a metric classifier 122. During operation, the restart detector 120 may determine, using one or more of a plurality of detection techniques, whether and when the restart event occurred, as well as which systems or subsystems of the technology landscape 104 were involved in the restart event.

The metric classifier 122 may then determine, identify, and classify relevant ones of the performance metrics 106 as being restart-impacted. For example, in a simplified example, it may occur that a component in the technology landscape 104 experiences a restart event detected by the restart detector 120. The metric classifier 122 may determine all performance metrics associated with the component that was restarted.

As in the simplified example given above, there may be 100 such performance metrics. During normal operations (e.g., prior to a restart event), it may be assumed that all 100 of these performance metrics are being scored using the score generator 114. In the system 100 of FIG. 1, the score generator 114 may continue to score the 100 performance metrics, regardless of the restart event.

However, the metric classifier 122 may use these scores to classify each of the 100 performance metrics as either restart-impacted or non-restart-impacted. For example, the metric classifier 122 may utilize a restart range and associated transition threshold(s) with respect to the scores received from the score generator 114.

In some examples, the restart range may simply be defined as including any score outside of an outer bound of the existing scoring thresholds used during normal operations of the performance characterization generator 110. Then, the associated transition threshold would simply be either or both of the normal outer scoring threshold values.

For example, as in the examples above, scoring thresholds/ranges may be set at −6.0, −3.0, −1.5, 1.5, 3.0, and 6.0. Then, the restart range may be defined as any score outside of −6.0 and 6.0 (e.g., less than −6.0, or more than 6.0), and the transition threshold may be defined as −6.0 and/or 6.0. In other examples, the restart range may be defined as a scoring range that is outside of the normal range, e.g., outside of −9.0 and 9.0, in which case −9.0 and/or 9.0 would define the transition threshold(s).

Thus, following a restart event detected by the restart detector 120 for the example component associated with 100 performance metrics, the metric classifier 122 may initially classify all 100 of the performance metrics as being restart-impacted. Then, the metric classifier 122 may compare the current scores of each of the 100 performance metrics to the restart range and/or transition threshold. Any of the 100 performance metrics having a score that is outside of the restart range (e.g., within the normal scoring range) may be transitioned to being classified as non-restart-impacted. Similarly, in other implementations, the metric classifier 122 may make an initial classification of each of the 100 performance metrics as either restart-impacted or non-restart-impacted, and may then proceed to transition the restart-impacted performance metrics to non-restart-impacted, as the restarted component continues to come fully online.

By way of more specific example, in the above-described scenario, it may occur that following a detected restart event, a particular performance metric is determined to have a score of −12.0, which may be well outside a normal expected range of, e.g., −6.0 to 6.0, which may also serve to define a restart range and transition threshold(s). Consequently, the metric classifier 122 may classify the performance metric as restart-impacted.

During a transition period following the restart event, the metric classifier 122 may continue to receive or otherwise monitor scores for the relevant, restart-impacted performance metric values from the score generator 114, based on the relevant model(s) within the model store 112. For example, received scores may trend from a post-restart value of −12.0 toward the transition threshold of the restart range, e.g., −6.0. Upon reaching the transition threshold, the metric classifier 122 may transition the restart-impacted performance metric from being classified as restart-impacted, to being classified as non-restart-impacted.

More generally, in the example of 20 of 100 performance metrics that are restart-impacted, it may occur that the 20 corresponding scores reach a transition threshold at widely varying times. For example, some of the 20 restart-impacted performance metric values may reach the transition threshold very quickly following a restart event, while others may take, for example, minutes, hours, or days.

It may be difficult to predict such transition periods with any accuracy. Moreover, such transition periods may vary among different restart events and for a same or similar component that is restarted multiple times. Nonetheless, because the restart tolerance manager 102 continually (or periodically) monitors and classifies scores of restart-impacted performance metrics during the transition period, the restart tolerance manager 102 may quickly and accurately transition restart-impacted performance metrics to be classified as non-restart-impacted performance metrics.

As referenced above, the example system 100 of FIG. 1 utilizes trained machine learning models to provide scores to be used for performance characterizations of the technology landscape 104. As described in detail below, e.g., with respect to FIGS. 3 and 4, restart events may be managed by the restart tolerance manager 102 during the training of such models, as well as during the deployment of such models within the model store 112 for use in scoring by the score generator 114.

For example, the system 100 is illustrated as including a training engine 124, as well as training data 126. For example, the training data 126 may be stored data. In other examples, the training data 126 may represent real-time receipt of the performance metrics 106, being used by the training engine 124 to train a new or existing performance model to be stored in the model store 112 and used by the score generator 114.

During such training operations, restart events contained within the training data 126 may be handled and processed in a similar way as described above with respect to operations of the restart tolerance manager 102 and the performance characterization generator 110.

Specifically, for example, the restart detector 120 may detect a presence of a restart event and identify associated component(s) or subsystem(s) within the training data 126. If all performance metrics in the training data 126 were included during subsequent training operations of the training engine 124, then resulting training would be degraded, and resulting trained models would be less accurate and less effective. That is, a model trained using false data following a restart event may, to varying extents, provide trained models that will provide inaccurate scores during subsequent normal scoring operations of the score generator 114.

However, in FIG. 1, following a restart event detection by the restart detector 120, the metric classifier 122 may proceed to classify relevant performance metrics within the training data 126 as being either restart-impacted performance metrics or non-restart-impacted performance metrics. Then, as described above, the metric classifier 122 may gradually and/or individually transition the restart-impacted performance metrics to being classified as non-restart-impacted performance metrics, based on defined restart ranges and associated transition thresholds.

For example, as described in detail below with respect to FIG. 3, the training engine 124 may use a pre-existing model ($M_{n-1}$) to train a current model ($M_n$), as part of a process of iteratively improving scoring of trained models. In such cases, scores from the existing model $M_{n-1}$ may be used by the metric classifier 122 to classify the relevant performance metrics as restart-impacted or non-restart-impacted, and to transition the restart-impacted performance metrics to being non-restart-impacted, for purposes of training the current model $M_n$.

Thus, the system 100 of FIG. 1 provides accurate performance characterizations of the technology landscape 104, regardless of a number or type of restart events that may occur therein. For example, conventional performance monitoring systems may deal with restart events by simply ignoring related KPIs for a defined time period following the restart event.

However, such approaches require that the performance characterizations are essentially blind with respect to the affected KPIs during the defined time period. Moreover, as referenced above, it is difficult to predict such a required length of such a defined time period. As a result, a length needed for such a defined time period may be overestimated (which only extends the period of time during which the monitoring system is blind with respect to affected KPIs) or underestimated (which increases a possibility of spurious scores being included in resulting performance characterizations). Consequently, important performance characterizations (e.g., alerts, anomalies, malfunctions) may be missed, or may be inaccurate, during such defined time periods.

In the system of FIG. 1, however, all available and non-restart-impacted performance metrics are used for scoring purposes, while all restart-impacted performance metrics are transitioned to non-restart-impacted as soon as a restart event is completed. Therefore, only truly false or incorrect performance metrics are omitted from inclusion in the performance characterization(s), and then only for a period of time during such performance metrics are actually impacted by a restart event.

In FIG. 1, the restart tolerance manager 102 is illustrated as being implemented using at least one computing device 128, including at least one processor 130, and a non-transitory computer-readable storage medium 132. That is, the non-transitory computer-readable storage medium 132 may store instructions that, when executed by the at least one processor 130, cause the at least one computing device 128 to provide the functionalities of the restart tolerance manager 102, and related functionalities.

For example, the at least one computing device 128 may represent one or more servers. For example, the at least one computing device 128 may be implemented as two or more servers in communications with one another over a network. Accordingly, the restart tolerance manager 102, the performance characterization generator 110, and the training engine 124 may be implemented using separate devices, in communication with one another. In other implementations, however, although the restart tolerance manager 102 is illustrated separately from the performance characterization generator 110, it will be appreciated that some or all of the respective functionalities of either of the restart tolerance manager 102 and the performance characterization generator 110 may be implemented partially or completely in the other, or in both.

Figure 2:
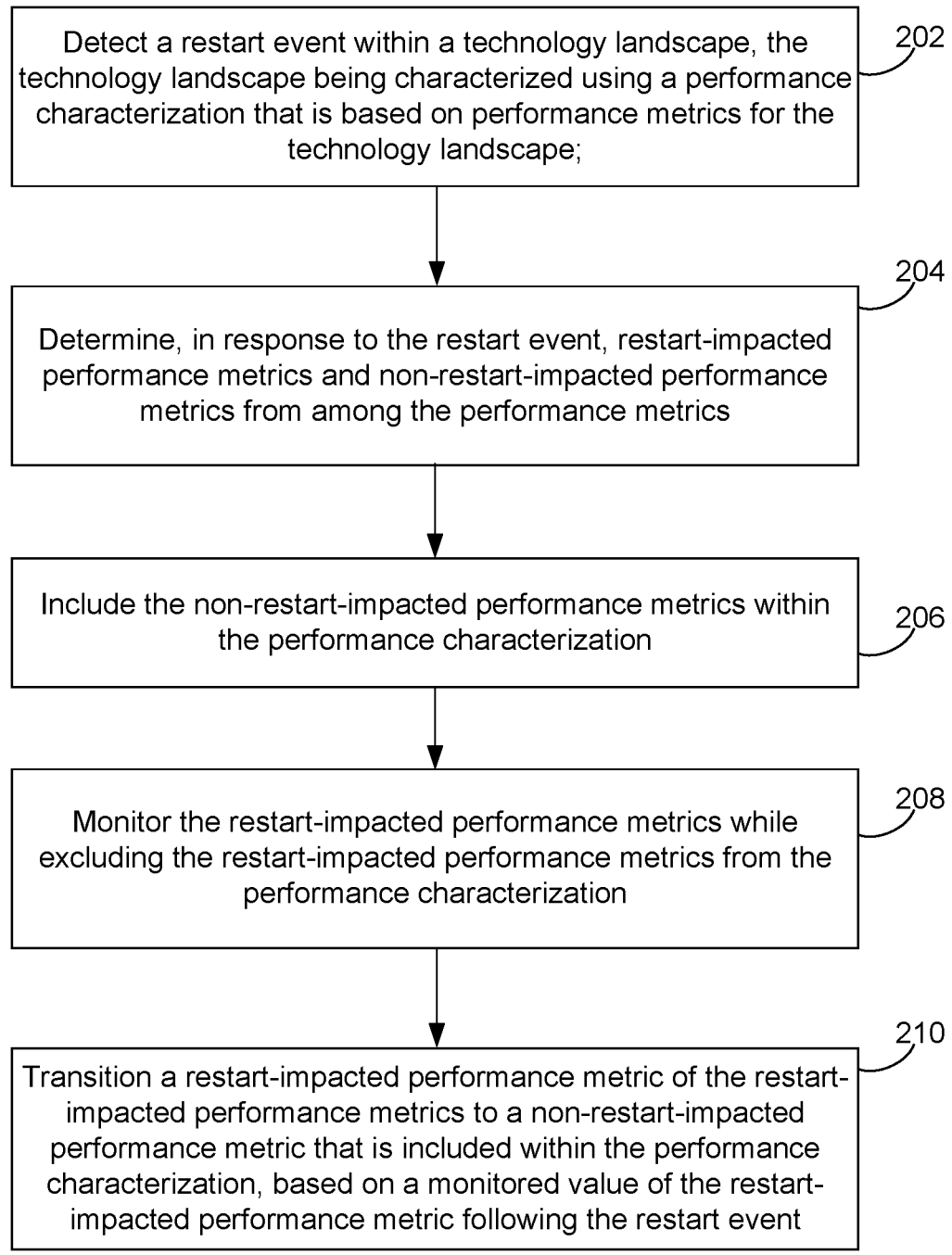
FIG. 2 is a flowchart illustrating example operations of the monitoring system of FIG. 1.

FIG. 2 is a flowchart illustrating example operations of the system of FIG. 1. In the example of FIG. 2, operations 202-210 are illustrated as separate, sequential operations. In various implementations, the operations 202-210 may include sub-operations, may be performed in a different order, may include alternative or additional operations, or may omit one or more operations. Further, in all such implementations, included operations may be performed in an iterative, looped, nested, or branched fashion.

In the example of FIG. 2, a restart event may be detected within a technology landscape, the technology landscape being characterized using a performance characterization that is based on performance metrics for the technology landscape (202). For example, the restart detector 120 may be configured to detect any restart event within the technology landscape 104, based on the performance metrics 106.

As described herein, a restart event may be detected using many different techniques. For example, a restart event may be detected in response to some relevant user input. In other examples, a restart event may be detected based on previously available performance metrics becoming unavailable for a period of time (e.g., during a time that a relevant component or subsystem is offline). In other examples, a restart event may be determined based on an addition of a new component, subsystem, or system to the technology landscape 104. In still other examples, a restart event may be determined based on detecting that one or more performance metric scores are within a restart range or based on a detection that a performance metric value itself is within (or outside of) a defined value range.

In response to the restart event, restart-impacted performance metrics and non-restart-impacted performance metrics may be determined from among the performance metrics (204). For example, the metric classifier 122 may be configured to identify a specific subset of performance metrics associated with the restart event, such as in the examples above in which 100 performance metrics associated with a restart event are identified. In such examples, the defined subset may be split into restart-impacted and non-restart-impacted performance metrics. In more specific examples, it may occur that all 100 of the subset of performance metrics are initially classified as restart-impacted, or, in other examples, only those performance metrics within the subset that are also scored within a restart range may be classified as restart-impacted. In still other examples, the non-restart-impacted performance metrics may simply be considered to be all other performance metrics within the performance metrics 106 that are not classified as restart-impacted (in other words, it may not be necessary to identify a specific subset of all performance metrics associated with the restart event, but rather just the restart-impacted performance metrics).

The non-restart-impacted performance metrics may be included within the performance characterization (206). For example, the metric classifier 122 may classify non-restart-impacted performance metrics, and/or associated scores thereof, for inclusion within a performance characterization based on scores provided by the score generator 114. Accordingly, the performance characterization generator 110 may continue to include scores for the non-restart-impacted performance metrics within the performance characterization, such as may be displayed in a GUI generated by the GUI generator 118.

The restart-impacted performance metrics may be monitored, while the restart-impacted performance metrics are excluded from the performance characterization (208). For example, the metric classifier 122 may classify restart-impacted performance metrics, and/or associated scores thereof, for exclusion from the performance characterization. For example, the score generator 114 may continue to score the restart-impacted performance metrics using the score generator 114, but the GUI generator 118 may replace corresponding performance characterizations (e.g., including the scores) from the displayed performance characterization. For example, as referenced above and illustrated in FIG. 6, the GUI generator 118 may generate a performance characterization GUI in which icons corresponding to scores or other performance characterizations of the restarted-impacted performance metrics (and/or underlying subsystem or component) are replaced with, or designated as, restart-impacted icons. In other words, the restart-impacted icons are displayed in place of corresponding score characterization icons that would otherwise be displayed.

A restart-impacted performance metric of the restart-impacted performance metrics may be transitioned to a non-restart-impacted performance metric that is included within the performance characterization, based on a monitored value of the restart-impacted performance metric following the restart event (210). For example, the metric classifier 122 may continually or periodically monitor scores or values of the restart-impacted performance metrics, e.g., based on scores from the score generator 114.

The metric classifier 122 may be provided with one or more restart range(s) and/or transition threshold(s). Then, by definition, the restart-impacted performance metric will have a value or score within the restart range, and outside of a transition threshold. A score of the restart-impacted performance metric will generally trend towards a steady-state value as post-restart operations of the restarted component or subsystem proceed. Once the trending score of the restart-impacted performance metric is outside of a restart range, e.g. reaches a transition threshold, the metric classifier 122 may classify the restart-impacted performance metric as a non-restart-impacted performance metric, or, put another way, may transition the restart-impacted performance metric from being classified as restart-impacted to being classified as a non-restart-impacted performance metric.

As noted above, some or all of the operations of FIG. 2 may be performed in the context of either training one or more models of the system 100 of FIG. 1 (using the training engine 124), or in the context of generating one or more performance characterizations (using the performance characterization generator 110). FIG. 3 provides additional example operations related to the example of using the system 100 in the training context, while FIG. 4 provides additional example operations related to the example of using the system 100 in the context of generating performance metric scores and other aspects of performance characterizations.

Figure 3:
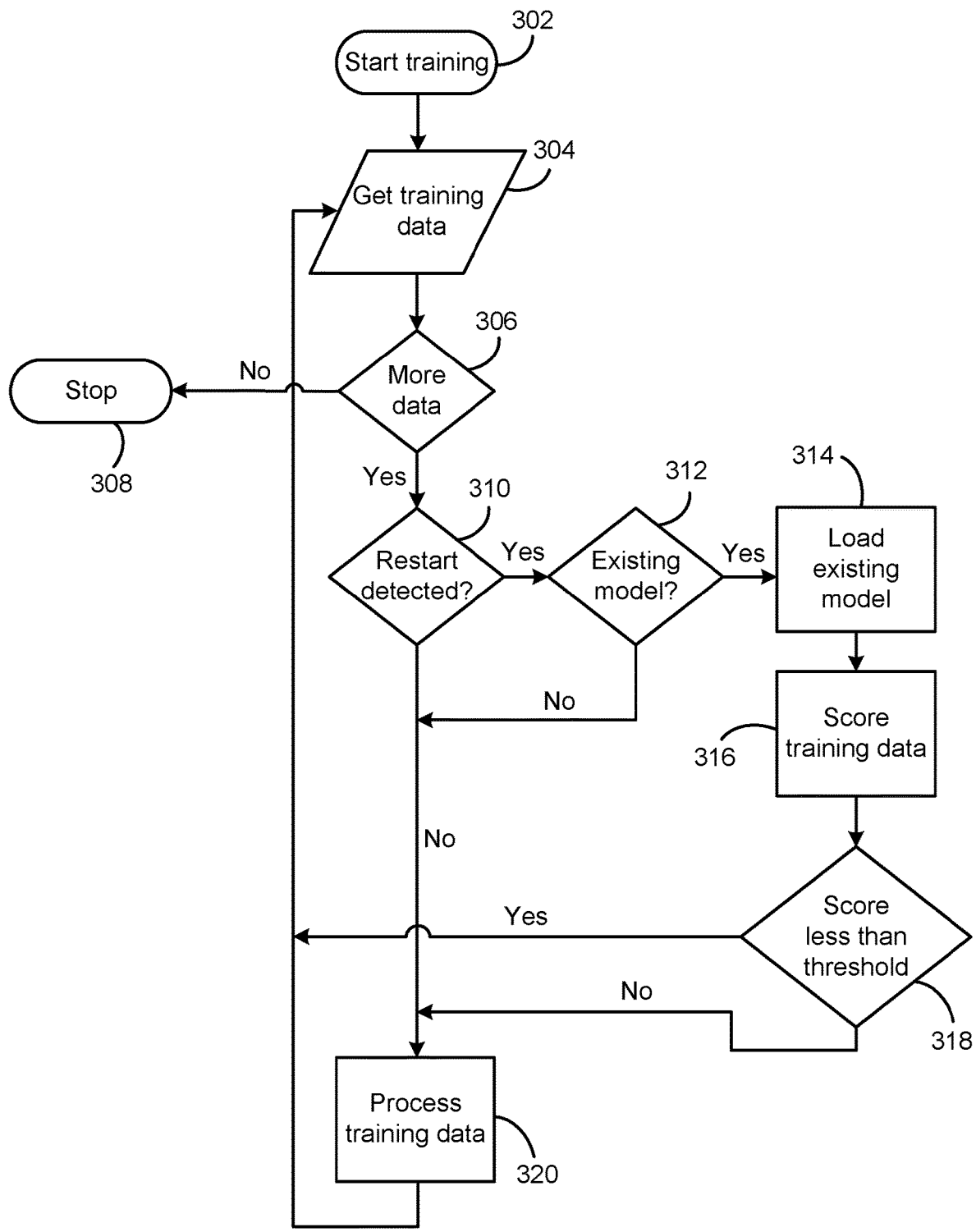
FIG. 3 is a flowchart illustrating example operations of the monitoring system of FIG. 1 during a training phase.
Figure 4:
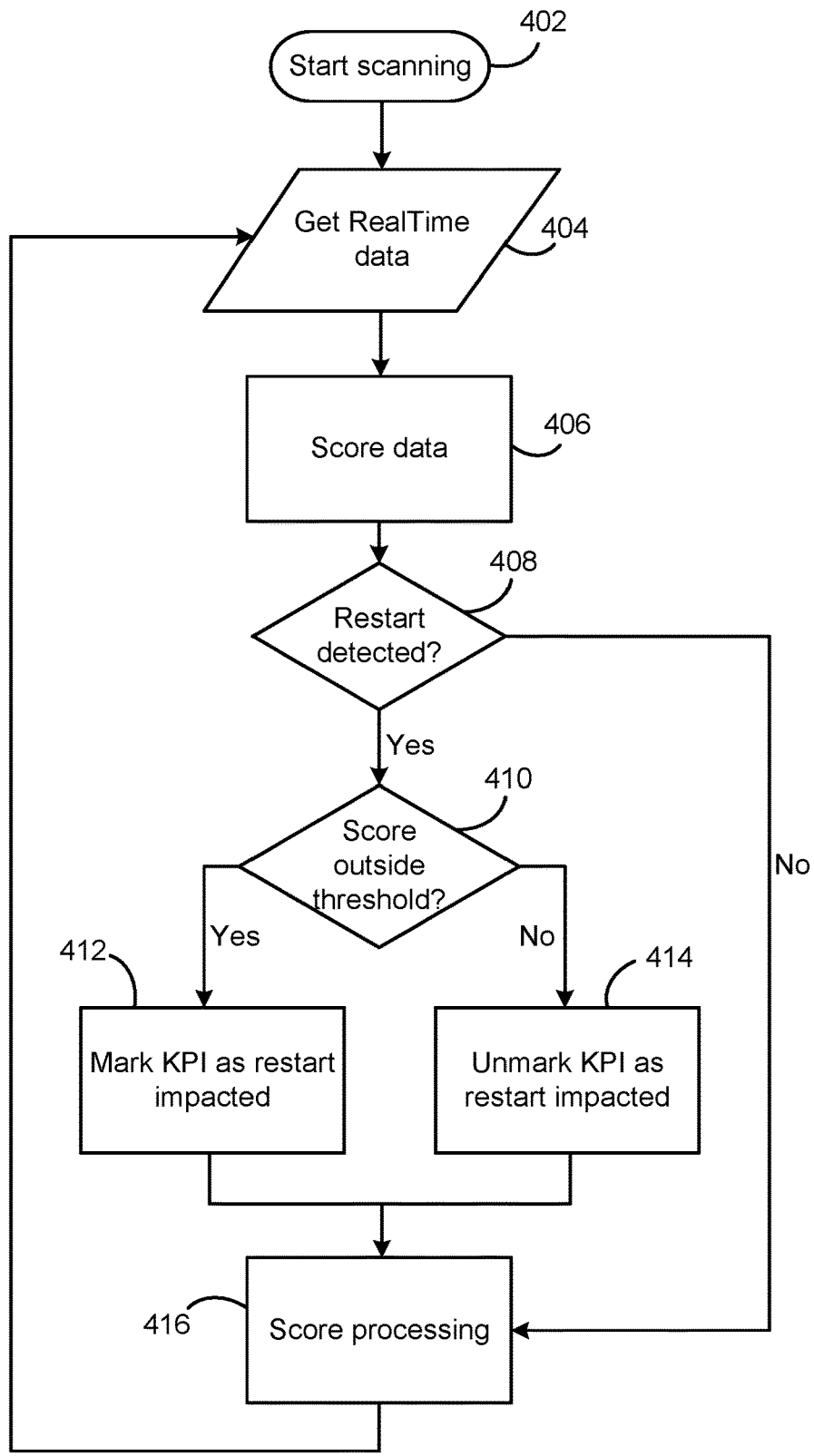
FIG. 4 is a flowchart illustrating example operations of the monitoring system of FIG. 1 during a scoring phase.
Figure 5:
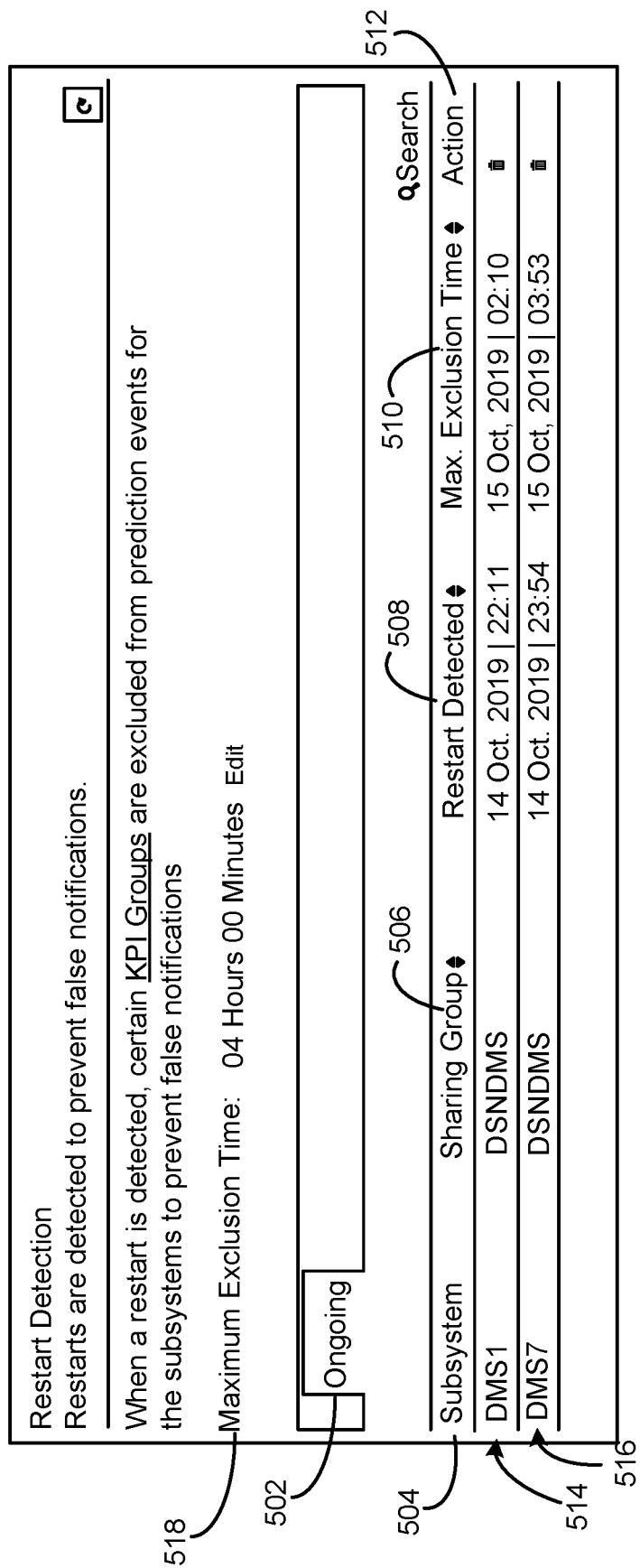
FIG. 5 is a first screenshot illustrating an example of restart detection using the monitoring system of FIG. 1.
Figure 6:
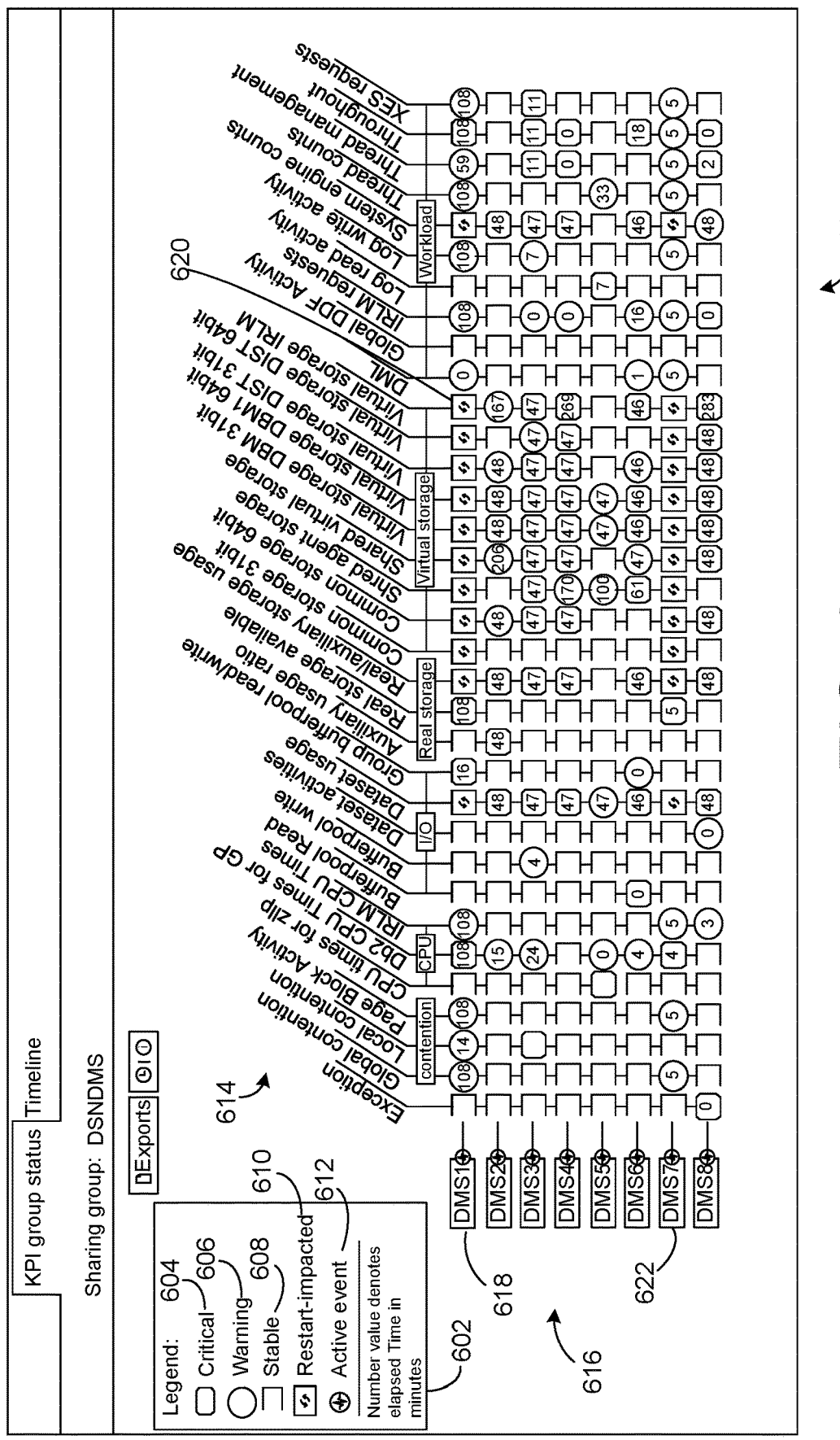
FIG. 6 is a second screenshot illustrating the example of restart detection of FIG. 5.

More specifically, in the examples of FIGS. 3 and 4, as well as in the example screenshots of FIGS. 5 and 6, it is assumed for the sake of non-limiting example that the technology landscape 104 includes a large number of systems and subsystems, and that the performance metrics 106 include corresponding KPIs and groups of KPIs used to monitor the technology landscape 104.

As referenced above, such computer systems often take time to reach a steady state following any sort of restart event. For example, rebooting any component from a laptop to a mainframe may require some amount of time before all impacted caches are populated and the memory is used. In the types of machine learning and artificial intelligence systems described above, performance metrics are scored against trained models, where such trained models are typically trained against a system that has reached steady state, or is assumed to have reached steady state. As referenced, in conventional versions of such systems, scoring of restart-impacted performance metrics (e.g., KPIs) will result in much larger anomaly scores than should actually be generated (which may also be referred to as false positive results). Further in such conventional systems, such anomalous, false positive results will continue to appear until the system has reached a steady state. In contrast, using the techniques described herein, such false positives are avoided. Restart events are accounted for in both the training and scoring phases.

FIG. 3 is a flowchart illustrating example operations of the system of FIG. 1 during a training phase. In the example of FIG. 3, in a training phase, when a restart is detected, only KPIs that reflect a steady state are used in the new model being trained. In FIG. 3, scoring is used to improve a data quality that is input to the training process, resulting in a more accurate model.

It is assumed in the example of FIG. 3 that a previous model is used in the training of a new or current model. Then, when a restart is detected by the restart detector 120, the training engine 124 uses scores provided by the previous model to determine whether to include current (i.e., post-restart event) data during the new or current model training. Such an approach allows for automatic and accurate outlier detection in the input data streams, thereby enhancing the data quality.

As illustrated in FIG. 3, following a start of a training process (302), training data is obtained (304). For example, the training engine 124 may retrieve the training data 126. If no more training data is available (306), then the process stops (308). Otherwise, the process proceeds, and, if no restart is detected (310), then the training data is processed (320), as long as additional training data continues to be available (304).

If a restart event is detected (310), then a determination is made as to whether an existing model is being used during the training process (312). If not, then training data processing may continue (320). However, if an existing model is being used (312), where such an existing model may be referred to herein as an $M_{n-1}$ model, then the existing model may be loaded (314). For example, the training engine 124 may load the existing model from the model store 112.

The training data may thus be scored (316) to provide data quality. For example, the training engine 124 may include a score generator, or may access the score generator 114.

If the score is less than the defined threshold (318), e.g., is within the restart range referenced above, then the underlying KPI(s) may be excluded (e.g., discarded) from the training data processing, and additional training data may be retrieved (304) to continue the process. However, if the score is not less than the threshold (318), then the underlying KPI may be included in the training data (320).

As a result, in FIG. 3, restart-impacted KPIs are effectively excluded from the training process, but are turned on for training purposes as they become sufficiently close to their steady state values. As referenced above, although not separately or explicitly illustrated in FIG. 3, a transition period may be defined following a restart event, and any restart-impacted KPIs that have not been transitioned to non-restart-impacted KPIs may be automatically transitioned to non-restart-impacted at the end of the transition period.

FIG. 4 is a flowchart illustrating example operations of the system of FIG. 1 during a scoring phase. As already referenced above, during real time scoring, a restart event may be detected, and restart-impacted KPIs may be automatically switched off for purposes of scoring, to thereby prevent unproductive scoring until such time as the restart tolerance may be safely removed. Restart-impacted KPIs become active (e.g., transitioned to non-restart-impacted KPIs) as soon as a defined transition threshold is reached for that KPI or KPI Group, rather than all restart-impacted KPIs becoming active at once following a specific period.

In FIG. 4, scanning of all monitored KPIs begins (402), e.g., by the metric monitor 108. Real time data is received (404) and scored (406), e.g., by the score generator 114.

As long as a restart event is not detected (408), e.g., by the restart detector 120, then score processing may continue (416). If a restart event is detected (408), then the metric classifier 122 may classify each relevant score as being outside of a threshold(s) (410), i.e., within a restart range. As referenced, a given KPI may be associated with a lower and/or an upper scoring threshold (e.g., −6.0 to 6.0), so that a restart range may be defined, for example, as below −6.0 or above 6.0. In example implementations, then, a first restart-impacted KPI may be designated recognized as having a score that is lower than a low threshold and approaching a corresponding transition threshold in an ascending fashion following a restart, while a second restart-impacted KPI may be designated or recognized as having a score that is higher than a high threshold following a restart event, and approaches a corresponding transition threshold in a descending fashion.

Each KPI that is restart-impacted may be marked as such (412), while each non-restart-impacted KPI may be left unmarked, or marked as non-restart-impacted (414). Score processing (416) may then continue with inclusion of scores of non-restart-impacted KPIs and exclusion of restart-impacted KPIs.

Both the restart-impacted KPIs and non-restart-impacted KPIs may continue to be monitored during a transition period following the restart event, so that the process flow of FIG. 4 continues during the transition period and thereafter. During the transition period, as the various restart-impacted KPIs approach steady state values and associated scores, the metric classifier 122 may re-classify and thus transition the restart-impacted KPIs for classification as non-restart-impacted KPIs.

In this regard, it will be appreciated that the restart detected (408) operation should be understood to reference a restart detected within any recent period of time within a defined maximum transition period. Although not separately or explicitly illustrated in FIG. 4, but as referenced above in detail, such a transition period may define a maximum time during which a restart event is predicted to have an impact on related KPI values and scores.

FIG. 5 is a first screenshot illustrating an example of restart detection using the monitoring system of FIG. 1. FIG. 5 illustrates a tab 502 that shows ongoing restart event detections. That is, the tab 502 indicates a restart event that has been detected but that is still within a maximum exclusion time (transition period) 518, or for which not all restart-impacted KPIs have been transitioned back to classification as non-restart-impacted KPIs.

In FIG. 5, a column 504 indicates one or more subsystems for which a restart event has been detected. Column 506 indicates a sharing group to which specified subsystems of column 504 may belong. It will be appreciated that the subsystems in the column 504 and sharing groups in the column 506 are merely examples of aspects of the technology landscape 104 for which restart events may be detected and tracked, and that these examples are non-limiting and many other types of systems or components may be tracked for restart event and impact detection, as well.

Further in FIG. 5, a column 508 indicates a time at which the restart event was detected, and a column 510 indicates a corresponding maximum time during which related KPIs may be excluded, based on the maximum exclusion time 518.

A column 512 indicates an action(s) that may be taken in response to corresponding values of the columns 508-510, within each populated row, shown in FIG. 5 as row 514 and row 516. For example, as described and illustrated below with respect to FIG. 6, an action may include modifying a GUI icon corresponding to restart-impacted KPI scores.

FIG. 6 is a second screenshot illustrating the example of restart detection of FIG. 5. In FIG. 6, a GUI 600 provides a performance characterization of monitored, scored KPIs of a technology landscape, as described above with respect to the system of FIG. 1.

In the example of FIG. 6, a legend 602 of symbols illustrates an icon 604 corresponding to a critical score for a corresponding KPI, an icon 606 corresponding to a warning score for a corresponding KPI, and an icon 608 corresponding to a stable score for a corresponding KPI. Of course, many other additional or alternative examples may be implemented. For example, the critical icon 604 may be colored red, while the warning icon 606 may be colored yellow, and the stable icon 608 may be colored green.

A restart-impacted icon 610, as referenced above and described in detail, below, may be used to designate a specific KPI or group of KPIs as being restart-impacted. An icon 612 may indicate an active event that requires correction or other suitable action. As also noted in the legend 602, inclusion of a number value within one of the icons 604 or 606 may be used to denote an elapsed time in minutes, for example, since the illustrated status (e.g., critical or warning) was reached.

Further in FIG. 6, a plurality of columns 614 indicate example KPIs or KPI groups that may be scored using described techniques. A plurality of rows 616 include corresponding subsystems having the KPIs of the columns 614.

Thus, in a row 618 for subsystem DMS1, it may be observed that various ones of the columns 614 have been modified to include the restart-impacted icon 610, indicating that the corresponding, underlying KPIs have been classified as restart-impacted. For example, an icon 620 representing a score for a group of KPIs related to "virtual storage internal resource lock manager (IRLM)" has been generated as an instance of a restart-impacted icon 610.

As also shown, however, various other icons of the row 618 are non-restart-impacted and include various examples of the icons 606 or 608. Similar comments apply to the row 622, as well.

Thus, described techniques enable automated restart tolerance, while scoring and displaying a current status of all monitored KPIs. It is not required to train a model to understand restarts, which may be difficult or unhelpful, since the impact of a restart event may vary widely depending on, e.g., time of day or other contextual factors. Instead, it is possible to transition restart-impacted KPIs to be classified as non-restart-impacted KPIs, and to do so very quickly upon a reaching of the specified transition threshold by a score of each restart-impacted KPI.

Implementations of the various techniques described herein may be implemented in digital electronic circuitry, or in computer hardware, firmware, software, or in combinations of them, such as mainframes, servers, workstations, desktops, laptops, etc. Implementations may be implemented as a computer program product, i.e., a computer program tangibly embodied in an information carrier, e.g., in a machine-readable storage device, for execution by, or to control the operation of data processing apparatus, e.g., a programmable processor, a computer, or multiple computers. A computer program, such as the computer program(s) described above, can be written in any form of programming language, including compiled or interpreted languages and can be deployed in any form, including as a stand-alone program or as a module, component, subroutine, or other unit suitable for use in a computing environment. A computer program can be deployed to be executed on one CPU or on multiple CPUs at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one CPU for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The CPU and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server; a middleware component, e.g., an application server; a front-end component, e.g., a client computer having a graphical user interface or a Web browser through which a user can interact with an implementation; or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments described above.

What is claimed is:

1. A computer program product, the computer program product being tangibly embodied in a non-transitory computer-readable storage medium and comprising instructions that, when executed by at least one computing device, are configured to cause the at least one computing device to:
   monitor, at the at least one computing device, a stream of performance metrics received from components of a technology landscape;
   generate a performance characterization of the technology landscape, using the stream of performance metrics, the performance characterization including characterizing each component of the components as operating normally or abnormally based on scores assigned to the performance metrics using a common scoring scheme that defines a normal range and a restart range;
   detect, based on the stream of performance metrics, a restart event within the technology landscape and associated with a component of the components;
   determine, in response to the restart event, restart-impacted performance metrics that have scores that are outside of the restart range and non-restart-impacted performance metrics that have scores that are within the restart;
   include scores of the non-restart-impacted performance metrics within the performance characterization;
   monitor, at the at least one computing device, scores of the restart-impacted performance metrics while excluding the restart-impacted performance metrics from the performance characterization;
   detect that a score of a restart-impacted performance metric is no longer within the restart range;
   automatically transition the restart-impacted performance metric of the restart-impacted performance metrics to a non-restart-impacted performance metric to be included within the performance characterization; and
   generate an alert within the performance characterization indicating that the component is operating outside of the normal range.

2. The computer program product of claim 1, wherein the performance characterization includes the scores assigned to the performance metrics using a trained machine learning model.

3. The computer program product of claim 2, wherein the restart event is detected based on the scores being outside of the restart range.

4. The computer program product of claim 2, wherein the performance characterization includes a graphical user interface (GUI) displaying classifications of the scores as normal or abnormal.

5. The computer program product of claim 4, wherein the instructions, when executed, are further configured to cause the at least one computing device to exclude the restart-impacted performance metrics from the performance characterization, including displaying restart-impacted icons in place of score characterization icons for the restart-impacted performance metrics.

6. The computer program product of claim 2, wherein the restart event is associated with a subsystem of the technology landscape and wherein the instructions, when executed, are further configured to cause the at least one computing device to determine the restart-impacted performance metrics and the non-restart-impacted performance metrics as being relevant to characterizing the subsystem.

7. The computer program product of claim 2, wherein the instructions, when executed to monitor the restart-impacted performance metrics while excluding the restart-impacted performance metrics from the performance characterization, are further configured to cause the at least one computing device to:

continue scoring the restart-impacted performance metrics using the trained machine learning model to obtain corresponding scores, while excluding the scores from the performance characterization.

8. The computer program product of claim 7, wherein a transition threshold is defined for the corresponding scores and wherein the instructions, when executed to transition the restart-impacted performance metric of the restart-impacted performance metrics to the non-restart-impacted performance metric, are further configured to cause the at least one computing device to:

determine that a score of the restart-impacted performance metric has reached the transition threshold; and
transition the restart-impacted performance metric to the non-restart-impacted performance metric, based on the score of the restart-impacted performance metric reaching the transition threshold.

9. The computer program product of claim 8, wherein the instructions are further configured to cause the at least one computing device to:

transition remaining ones of the restart-impacted performance metrics to non-restart-impacted performance metrics as the corresponding scores thereof reach the transition threshold; and
transition, following a transition period, any remaining ones of the restart-impacted performance metrics that have not reached the transition threshold to non-restart-impacted performance metrics.

10. The computer program product of claim 1, configured to cause:

training of a current machine learning model to score the performance metrics and thereby generate the performance characterization, using an existing machine learning model;
in response to the detection of the restart event, omitting the restart-impacted performance metrics from the training of the current machine learning model, based on scores of the restart-impacted performance metrics obtained from the existing machine learning model; and
transitioning the restart-impacted performance metric to the non-restart-impacted performance metric based on a score of the restart-impacted performance metric reaching a transition threshold, including using the non-restart-impacted performance metric in the training.

11. A computer-implemented method, the method comprising:

monitoring, using at least one computing device, a stream of performance metrics received from components of a technology landscape;
generating a performance characterization of the technology landscape, using the stream of performance metrics, the performance characterization including characterizing each component of the components as operating normally or abnormally based on scores assigned to the performance metrics using a common scoring scheme that defines a normal range and a restart range;
detecting, based on the stream of performance metrics, a restart event within the technology landscape and associated with a component of the components;
determining, in response to the restart event, restart-impacted performance metrics that have scores that are outside of the restart range and non-restart-impacted performance metrics that have scores that are within the restart range;
including scores of the non-restart-impacted performance metrics within the performance characterization;
monitoring, at the at least one computing device, scores of the restart-impacted performance metrics while excluding the restart-impacted performance metrics from the performance characterization;
detecting that a score of a restart-impacted performance metric is no longer within the restart range;
automatically transitioning the restart-impacted performance metric of the restart-impacted performance metrics to a non-restart-impacted performance metric to be included within the performance characterization; and
generating an alert indicating that the component is operating outside of the normal range.

12. The method of claim 11, wherein the performance characterization includes the scores assigned to the performance metrics using a trained machine learning model.

13. The method of claim 12, wherein detecting the restart event includes detecting the scores being outside of the restart range.

14. The method of claim 12, wherein the performance characterization includes a graphical user interface (GUI) displaying classifications of the scores as normal or abnormal.

15. The method of claim 14, wherein the GUI includes displaying restart-impacted icons in place of score characterization icons for the restart-impacted performance metrics and wherein, the transitioning includes replacing a restart-impacted icon of the restart-impacted performance metric with a corresponding score characterization icon of the non-restart-impacted performance metric.

16. The method of claim 12, comprising:

scoring the restart-impacted performance metrics using the trained machine learning model to obtain corresponding scores, while excluding the scores from the performance characterization; and
transitioning the restart-impacted performance metric to the non-restart-impacted performance metric, based on a score thereof.

17. A system comprising:

at least one memory including instructions; and
at least one processor that is operably coupled to the at least one memory and that is arranged and configured to execute the instructions and cause the at least one processor to:
monitor a stream of performance metrics received from components of a technology landscape;
generate a performance characterization of the technology landscape, using the stream of performance metrics, the performance characterization including characterizing each component of the components as operating normally or abnormally based on scores assigned to the performance metrics using a common scoring scheme that defines a normal range and a restart range;
detect, based on the stream of performance metrics, a restart event within the technology landscape and associated with a component of the components;
determine, in response to the restart event, restart-impacted performance metrics that have scores that are outside of the restart range and non-restart-impacted performance metrics that have scores that are within the restart range;
include scores of the non-restart-impacted performance metrics within the performance characterization;

monitor scores of the restart-impacted performance metrics while excluding the restart-impacted performance metrics from the performance characterization;
detect that a score of a restart-impacted performance metric is no longer within the restart range;
automatically transition the restart-impacted performance metric of the restart-impacted performance metrics to a non-restart-impacted performance metric to be included within the performance characterization; and
generate an alert indicating that the component is operating outside of the normal range.

18. The system of claim 17, wherein the performance characterization includes the scores assigned to the performance metrics using a trained machine learning model.

19. The system of claim 18, wherein the performance characterization includes a graphical user interface (GUI) displaying classifications of the scores, and further wherein the system is configured to:
generate the GUI including restart-impacted icons displayed in place of score characterization icons for the restart-impacted performance metrics, and
transition the restart-impacted performance metric to the non-restart-impacted performance metric including replacing a restart-impacted icon of the restart-impacted performance metric with a corresponding score characterization icon of the non-restart-impacted performance metric.

20. The system of claim 18, wherein the system is further configured to:
score the restart-impacted performance metrics using the trained machine learning model to obtain corresponding scores, while excluding the scores from the performance characterization; and
transition the restart-impacted performance metric to the non-restart-impacted performance metric, based on a score thereof.

* * * * *

UNITED STATES PATENT AND TRADEMARK OFFICE
CERTIFICATE OF CORRECTION

PATENT NO. : 11,886,297 B2
APPLICATION NO. : 18/054024
DATED : January 30, 2024
INVENTOR(S) : Slinger et al.

Page 1 of 1

It is certified that error appears in the above-identified patent and that said Letters Patent is hereby corrected as shown below:

In the Claims

In Column 16, Claim 1, Line 24, delete "restart;" and insert -- restart range; --, therefor.

Signed and Sealed this
Twenty-fourth Day of September, 2024

Katherine Kelly Vidal
*Director of the United States Patent and Trademark Office*